No. 675,918. Patented June 11, 1901.
V. G. APPLE.
STORAGE BATTERY.
(Application filed Nov. 1, 1900.)
(No Model.)
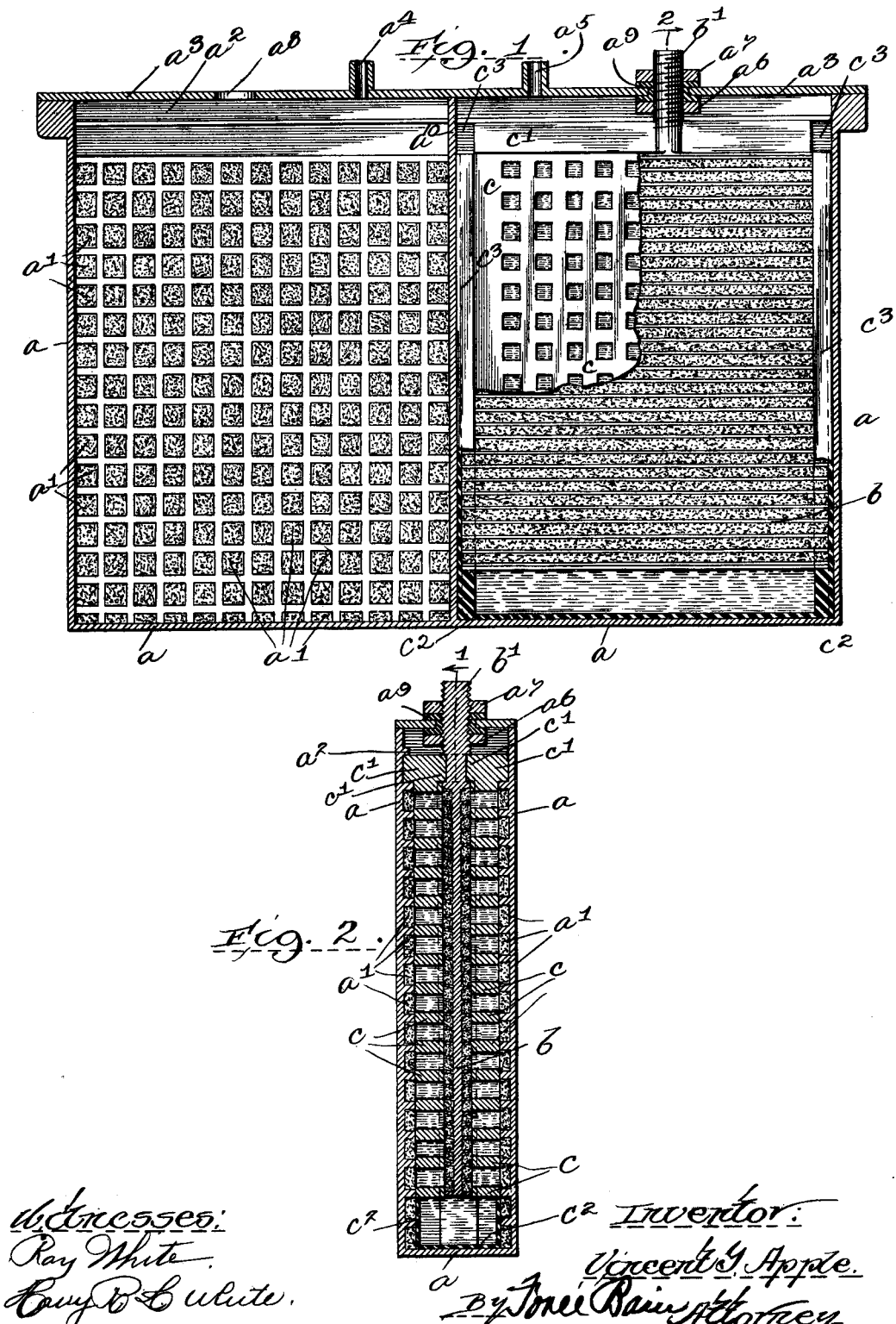
Witnesses:
Ray White
Inventor:
Vincent G. Apple.

UNITED STATES PATENT OFFICE.

VINCENT G. APPLE, OF DAYTON, OHIO, ASSIGNOR TO THE DAYTON ELECTRICAL MANUFACTURING CO., OF SAME PLACE.

STORAGE BATTERY.

SPECIFICATION forming part of Letters Patent No. 675,918, dated June 11, 1901.

Application filed November 1, 1900. Serial No. 35,095. (No model.)

*To all whom it may concern:*

Be it known that I, VINCENT G. APPLE, a citizen of the United States, residing at Dayton, county of Montgomery, and State of Ohio, have invented certain new and useful Improvements in Storage Batteries; and I do hereby declare the following to be a full, clear, and exact description, such as will enable persons skilled in the art to which it appertains to make and use the same.

My invention relates to improvements in storage batteries.

One of the objects of my invention is to provide a battery unit which consists, essentially, of two compartments, and which I shall designate a "two-cell integral unit." The case in which the electrolyte is to be contained is made of lead or an alloy or any metallic or other conducting substance which may be found to answer the purpose for which my unit is designed. The said case is divided in the center by a partition of similar material forming two compartments made in one integral construction. The interior of each compartment is provided with indentations or similar receptacles for containing active material, such as an oxid of lead, and this may be either pasted upon the surfaces of the interior of each compartment or it may be formed thereon by an electrochemical or other process.

One of the particular advantages arising out of the construction of my battery unit consists in the fact that the two cells constituting the unit are connected together through the body of the case and that the number of connections necessary for this unit are very small, and, further, that each unit consists of two cells and produces four volts per unit, whereby a respectively high voltage is secured with a correspondingly-small number of units.

In the accompanying drawings, Figure 1 is a section through line 1 1 of Fig. 2. Fig. 2 is a section through line 2 2 of Fig. 1.

In both of the figures the same letters of reference indicate similar parts.

$a$ is a casing made of lead or a lead alloy or other conducting substance, comprising two compartments divided by a partition $a^{10}$ placed between the two cells, the said partition being made, preferably, of the same material as the outer walls.

$a'$ is a gridded or other serrated surface for containing the active material. This surface is contained on both sides of both cells and may be at the end of each cell, or it may be contained on both sides only. Again, a series of serrated ribs or a grid or other surface may be fixed thereto, so that the interior surfaces of the cell will be active. Either method may be used that may be found best adapted to this purpose.

$a^2$ is a rib located near the top of the interior of the cell. The said rib runs longitudinally across each of the cells on one side only and serves as a means for holding the element in place.

$a^3$ is a top or lid for the cell, made, preferably, of the same material of which the cell is composed.

$a^8$ is a perforation in the top $a^3$ for the purpose of permitting the terminals $b'$ of the plate $b$ to project through the top, so as to form a connection with the removable element or plate $b$. Insulating-washers $a^9$ are adapted to fit into the perforation $a^8$ and around the terminals $b'$ of the element $b$. The nuts $a^6$ and $a^7$ are adapted to be screwed over the terminal $b'$ and the lower one to form an abutment for the washers and the upper one to be tightly screwed down on the washers to provide a gas-tight joint.

In the two-cell unit the left-hand compartment is shown with the element $b$ and the separator $c$ removed. The separator $c$ is shown broken away in the right-hand compartment of the duplex cell.

$c'$ is a rib which is an internal part of the separator and is placed at the top thereof across the face of the said separator.

$c^2$ is a hard-rubber box which extends across the bottom of the cell and below the element or plate $b$. It is provided with vertically-grooved extensions $c^3$, which are placed against the vertical sides of the cell, and into these grooves the plate $b$ is adapted to be contained. After the interior of the cell has been formed and after the active material has been placed upon the surface thereof in a proper manner the insulating-box $c^2$, which is provided with the vertically-grooved side strips $c^3$, is placed in the cell and the rib $c'$ is inserted on the side, where the special rib $a^2$ is located, near the top of the cell. The rib $c'$ of the separator $c$ is forced under the projection $a^2$, and by this means it is held very firmly in the cell. Then the plate or element $b$ is introduced in the grooves of the side strips $c^3$ and pushed down until the rib $c'$, on the opposite side from that just referred to, of the separator $c$ engages over the top edge of the plate $b$ when the side of said plate is flush with the side of the separator. Then the separator $c$ on the other side of the plate is placed in position. By this means the plate $b$ is held under the ledge or rib of the separator $c$, and the separator in turn is held in position by the projection $a^2$ on the interior of the cell. After the elements in both cells have been assembled in the manner described the top or lid $a^3$ is placed over both of the cells, and the terminals $b'$ of each of the removable elements are properly insulated and a gas-tight joint is made between the two nuts $a^6$ and $a^7$ with the insulating material $a^9$. After this has been done the top $a^3$ is burned or otherwise joined to the top edge of the cell, so as to produce a gas-tight compartment.

It is obvious that by virtue of the construction which I have described the interior surfaces of one compartment or cell of my battery unit will be positive and the interior of the adjoining compartment or cell will be negative and the respective removable elements will be of opposite polarity to that of the compartment in which they are contained.

If the compartments are made of a material that is not easily affected by the electrolyte by the process of charging and discharging, there will be no disintegrating effect to cause the cell to break down or fall to pieces. This might result to a limited degree if pure lead were used for the supporting-walls of the case instead of the proper alloy. I may use pure lead as a lining for the interior of the compartments and an alloy on the outside, or both compartments may be made of an alloy and an active sheet of material composed principally of pure lead may be placed on the interior and fixed to the sides of the said cells.

My invention consists, essentially, in an integral two-cell electric couple, each cell containing an active removable element, the product of the electromotive forces being four volts, or thereabout, or double the voltage that one cell would produce separately.

Of course a series of my double-cell units may be connected in electric circuit in series with each other and produce jointly an electromotive force due to the number of single cells contained in the series in multiples of four volts per unit.

Having described my invention, what I claim as new, and desire to secure by Letters Patent of the United States, is—

1. An electric accumulator, or storage-battery unit, comprising an integral, metallic containing-case provided with two compartments, electrically-active material upon the interior surfaces of each compartment and one or more electrodes within each compartment, substantially as set forth.

2. An electric accumulator, or storage-battery unit, comprising an integral, metallic containing-case, provided with two compartments, interior surfaces within each compartment, susceptible of electrochemical activity, and removable electrochemically-active elements in each compartment, of potentially opposite character, with respect to each other, and with respect to the interior surfaces of the compartments, in which they are contained, substantially as set forth.

In testimony whereof I have signed this specification, in the presence of two subscribing witnesses, this 20th day of October, A. D. 1900.

VINCENT G. APPLE.

Witnesses:
H. APPLE,
C. E. RILEY.